US008830229B2

(12) United States Patent
Drost et al.

(10) Patent No.: US 8,830,229 B2
(45) Date of Patent: Sep. 9, 2014

(54) RECOGNITION AND POSE DETERMINATION OF 3D OBJECTS IN 3D SCENES

(75) Inventors: Bertram Heinrich Drost, Munich (DE); Markus Ulrich, Munich (DE)

(73) Assignee: MVTec Software GmbH, Munich (DE)

( * ) Notice: Subject to any disclaimer, the term of this patent is extended or adjusted under 35 U.S.C. 154(b) by 531 days.

(21) Appl. No.: 12/985,861

(22) Filed: Jan. 6, 2011

(65) Prior Publication Data

US 2011/0273442 A1 Nov. 10, 2011

(51) Int. Cl.
*G06T 7/00* (2006.01)
*G06K 9/62* (2006.01)
*G06K 9/00* (2006.01)

(52) U.S. Cl.
CPC .......... *G06K 9/00214* (2013.01); *G06K 9/6211* (2013.01)
USPC .......................................... 345/419; 382/195

(58) Field of Classification Search
CPC .......................................... G06T 7/004–7/0046
USPC .......................................................... 345/420
See application file for complete search history.

(56) References Cited

U.S. PATENT DOCUMENTS 5,666,441 A 9/1997 Rao et al.
5,864,779 A * 1/1999 Fujimoto ..................... 702/179
6,526,156 B1 2/2003 Black et al.
6,580,821 B1 6/2003 Roy
6,816,755 B2 11/2004 Habibi et al.
6,956,569 B1 10/2005 Roy et al.
7,239,929 B2 7/2007 Ulrich et al.
2001/0020946 A1 9/2001 Kawakami et al.
2002/0181780 A1 12/2002 Simon et al.
2003/0123713 A1 7/2003 Genz
2004/0175041 A1 9/2004 Miller
2005/0286767 A1 12/2005 Hager et al.
2009/0096790 A1 4/2009 Wiedemann et al.

FOREIGN PATENT DOCUMENTS

CA 2535828 2/2005
CA 2555159 8/2005
EP 1193642 4/2002
EP 1693782 8/2006
JP 2002-245455 8/2002
JP 2006-301991 11/2006

OTHER PUBLICATIONS

Matei et al., "Rapid Object Indexing Using Locality Sensitive Hashing and Joint 3D-Signature Space Estimation", Jul. 2006, IEEE Transactions on Pattern Analysis and Machine Intelligence, vol. 28, No. 7, p. 1111-1126.*

(Continued)

*Primary Examiner* — Kee M Tung
*Assistant Examiner* — Ryan D McCulley
(74) *Attorney, Agent, or Firm* — Kagan Binder, PLLC

(57) ABSTRACT

The invention provides a method for recognizing instances of a 3D object in 3D scene data and for determining the 3D poses of said instances comprising the following steps: (a) providing 3D scene data; (b) selecting at least one reference point from the 3D scene data; (c) computing, for each selected reference point, pose candidates for the 3D object under the assumption that said reference point is part of the 3D object; and (d) computing a set of filtered poses from the pose candidates.

13 Claims, 4 Drawing Sheets

(56) References Cited

OTHER PUBLICATIONS

Wahl, "Surflet-Pair-Relation Histograms: A Statistical 3D-Shape Representation for Rapid Classification", Oct. 2003, IEEE, 3-D Digital Imaging and Modeling, 2003, Conference proceedings.*
Costa, "3D Object Recognition and Pose with Relational Indexing", Jun. 2000, Academic Press, Computer Vision and Image Understanding, No. 79, p. 364-407.*
Grimson et al., "Recognizing 3D Objects from 2D Images: An Error Analysis", Jul. 1992, Massachusetts Institute of Technology Artificial Intelligence Laboratory, A.I. Memo No. 1362.*
Shakhnarovich et al., "Fast Pose Estimation with Parameter Sensitive Hashing", Apr. 2003, Massachusetts Institute of Technology Artificial Intelligence Laboratory, A.I. Memo No. 2003-009.*
Poppe et al., "Comparison of Silhouette Shape Descriptors for Example-based Human Pose Recovery", Apr. 2006, IEEE, Automatic Face and Gesture Recognition, 2006, Conference proceedings.*
Ballard, D.H., Generalizing the Hough transform to detect arbitrary shapes. Pattern Recognition, 13(2):111-122, 1981.
Bern, M. W. et al., Mesh generation and optimal triangulation, Technical Report CSL-92-1, Xerox Palo Alto Research Center, 1992.
Beveridge, J. R. et al., Optimal Geometric Model Matching under Full 3D Perspective, Computer Vision and Image Understanding, 61(3): 351-364,1995.
Bookstein, Fred L., "Principal Warps: Thin-Plate Splines and the Decomposition of Deformations", IEEE Transactions on pattern Analysis and Machine Intelligence, vol. 11, No. 6, Jun. 1989, pp. 567-585.
Borgefors, G., Hierarchical chamfer matching: A parametric edge matching algorithm. IEEE Transactions on Pattern Analysis and Machine Intelligence, 10(6): 849-865,1988.
Brown, L. G., A survey of image registration techniques. ACM Computing Surveys, 24(4): 325-376, Dec. 1992.
David, P. et al., Simultaneous Pose and Correspondence Determination using Line Features, Conference on Computer Vision and Pattern Recognition 2003, vol. 2: 424-431,2003.
Di Zenzo, S., A note on the gradient of a multi-image. Computer Vision, Graphics, and Image Processing 33: 116-125, 1986.
Ekenel, Hazim Kemal et al., "Multiresolution Face Recognition", Image Vision Comput; Image and Vision Computing, May 1, 2005, vol. 23, No. 5, pp. 469-477.
European Search Report issued in EP Application No. 07118329, dated Jan. 2, 2008.
Gavrila, D. M. et al., 3D object recognition from 20 images using geometric hashing, Pattern Recognition Letters 13: 263-278,1992.
Horaud, R., New Methods for Matching 3-D Objects with Single Perspective Views, IEEE Transactions on Pattern Analysis and Machine Intelligence, 9(3): 401-412, 1987.
Huang, Chang et al., "High Performance Rotation Invariant Multiview Face Detection", IEEE Transactions on Pattern Analysis and Machine Intelligence, vol. 29, No. 4, Apr. 2007, pp. 671-686.
Jain, Anil K. et al., "Object Matching Using Deformable Templates", IEEE Transactions on Pattern Analysis and Machine Intelligence, vol. 18, No. 3, Mar. 1996, pp. 267-278.
Lanser, S. et al., Multibildkalibrierung einer CCD-Kamera, in G. Sagerer, S. Posch and F. Kummert (editors), Musterkennung, Informatik aktuell, Springer-Verlag, Berlin: 481-491, 1995. English translation of abstract included.
Lanser, S., Modellbasierte Lokalisation gestiitzt auf monokulare Videobilder, Dissertation thesis, Technische Universita Munchen, Fakultat fur Informatik, 1997. English translation of Table of Contents included.
Lepetit, V. et al., Point Matching as a Classification Problem for Fast and Robust Object Pose Estimation, Conference on Computer Vision and Pattern Recognition, vol. 2: 244-250, 2004.
Munkelt, O., Erkennung von Objekten in Einzelvideobildern mittels Aspektbaumen, Dissertation thesis, Technische Universitat Munchen, Institut for Informatik, Munchen, 1996. English translation of abstract and Table of Contents included.
Office Action issued in JP Application No. 2008-40298 dated Dec. 21, 2010, 4 pages.
Paterson, M. S. et al., Efficient binary space partitions for hidden-surface removal and solid modeling. Discrete & Computational Geometry, 5(1): 485-503,1990.
Rucklidge, W. J., Efficiently locating objects using the Hausdorff distance. International Journal of Computer Vision, 24 (3): 251-270, 1997.
Rypl, D., Approaches to Discretization of 3D Surfaces, Habilitation thesis, CTU Reports, 7(2), CTU Publishing House, Prague, Czech Republic, ISBN 80-01-02755-4, 2003.
Shi, Jianbo et al., "Normalized Cuts and Image Segmentation", Proc. of the IEEE Conf. on Comp. Vision and Pattern Recognition, San Juan, Puerto Rico, Jun. 1997.
Sumi, Y. et al., Object Recognition Using Segment-Based Stereo Vision, Asian Conference on Computer Vision: 249-256, 1998.
Tanimoto, S. L., Template matching in pyramids, Computer Graphics and Image Processing 16: 356-369,1981.
Ulrich, M. et al., Real-time object recognition using a modified generalized Hough transform, Pattern Recognition, 36(11): 2557-2570, 2003.
Ulrich, M., Hierarchical Real-Time Recognition of Compound Objects in Images, Dissertation thesis, Technische Universitat MOnchen, Fakultat Bauingenieur-und Vermessungswesen, Deutsche Geodatische Kommission bei der Bayerischen Akademie der Wissenschaften, Reihe C: Dissertationen, Heft Nr. 568, Munchen, 2003.
European Search Report, EP Application No. 10162266.0-1224, dated Jan. 31, 2011.
Barequet et al., Partial Surface Matching by Using Directed Footprints, C-9-C-10.
Barequet et al., "Partial Surface and Volume Matching in Three Dimensions," 610-614.
Hillenbrand, "Pose Clustering From Stereo Data," Proceedings VISAPP International Workshop in Robotic Perception 2008, pp. 23-32.
Lamdan et al., "Geometric Hashing: A General and Efficient Model-Based Recognition Scheme," pp. 238-249.
Mao et al., "Integration of Multiple Feature Groups and Multiple Views Into A 3D Object Recognition System," Feb. 8, 1994, pp. 184-191.
Mian et al., "3D Recognition and Segmentation of Objects in Cluttered Scenes," 2005, pp. 9-11.
Seghal et al., "3D object recognition using Bayesian geometric hashing and pose clustering," Pattern Recognition 36 (2003), pp. 765-780.
Stockman, "Object Recognition and Localization via Pose Clustering," Dec. 1, 1987.
Winkelbach et al., "Low-Cost Laser Range Scanner and Fast Surface Registration Approach," Jan. 1, 2006, 718-728.
Winkelbach et al., "Fast Random Sample matching of 3D Fragments," 2004.

* cited by examiner

RECOGNITION AND POSE DETERMINATION OF 3D OBJECTS IN 3D SCENES

CROSS-REFERENCE TO RELATED APPLICATIONS

This application claims priority to European Application No. 10 16 2266.0, filed May 7, 2010, which is incorporated herein by reference in its entirety.

FIELD OF THE INVENTION

This invention relates generally to machine vision systems, and more particularly, to the recognition and localization of 3D objects in 3D scenes.

BACKGROUND OF THE INVENTION 3D object recognition is part of many computer vision applications. Compared to image-based computer vision that deals with planar intensity images, 3D computer vision deals with three-dimensional information and is especially important where non-planar objects and surfaces need to be inspected or manipulated. Many different methods and sensors were developed for acquiring the 3D surface information of a scene. Many of those methods return a so-called range image, which is an image where the value at each point represents the distance of the scene surface from the camera. If the sensor is calibrated and its internal parameters are known, the range image can be transformed into a 3D scene where the X-, Y- and Z-coordinate of every point is known. Additionally, the information from multiple sensors can be fused to get a 3D scene that can not be expressed as range image. Contrary to prior art, the disclosed method is able to recognize free-form objects of any shape in arbitrary 3D scenes and does not require an approximate pose as a-priori information.

Descriptor- or feature-based techniques are based on finding correspondences between 3D points in the scene and 3D points on the object by using surface descriptors. Surface descriptors express the surface around a point on that surface using a low-dimensional representation. Typically, the surface descriptors are calculated for all points on the surface of the object and stored in a database. For recognizing the object in a scene, the surface descriptors are calculated for points in the scene and corresponding object points are searched using the pre-computed database. Once enough correspondences were found, the pose of the object can be recovered. Extensive overviews of different surface descriptors are given in Campbell and Flynn (A Survey Of Free-Form Object Representation and Recognition Techniques, 2001, Computer Vision and Image Understanding, Vol. 81, Issue 2, pp. 166-210), Mamic and Bennamoun (Representation and recognition of 3D free-form objects, 2002, Digital Signal Processing, Vol. 12, Issue 1, pp. 47-76) and Mian et al. (Automatic Correspondence for 3D Modeling: An Extensive Review, 2005, International Journal of Shape Modeling, Vol. 11, Issue 2, p. 253).

Several drawbacks are associated with approaches that rely on correspondence search with local descriptors: First, local descriptors cannot discriminate between similar surface parts on an object, such as larger planar patches. Such similar parts lead to equal or similar local descriptors and in turn to incorrect correspondences between the scene and the object. Increasing the radius of influence such that non-similar surface parts are included in the construction of the descriptor leads to sensitivity against missing parts of the surface, which are frequent in case of occlusion or sensor problems. Second, local descriptors are typically too slow to be implemented in real-time systems and require processing times of several seconds. Third, local descriptors are sensitive to clutter, i.e. scene parts that do not belong to the object of interest. Furthermore, local descriptors require a dense representation of the 3D scene data, which is often not available. Finally, the present descriptors are not fast enough for real-time applications.

Several approaches use so-called geometric primitives to detect an object in a scene. A geometric primitive is a simple geometric object, such as a plane, a cylinder or a sphere. Compared to free-form objects, geometric primitives are easier detectable in a scene due to their intrinsic symmetries. Several methods exist that detect primitives or objects composed of geometric primitives in scenes. In EP-A-2 047 403, the 3D object is partitioned into geometric primitives. Such geometric primitives are then searched for in the 3D scene, and the object is recognized by identifying primitives in the scene that are similar to primitives in the object. Other methods use a variant of the generalized Hough transform to detect geometric primitives in the scene, for example Katsoulas (Robust extraction of vertices in range images by constraining the hough transform, 2003, Lecture Notes in Computer Science, Vol. 2652, pp. 360-369), Rabbani and Heuvel (Efficient hough transform for automatic detection of cylinders in point clouds, 2005, Proceedings of the 11th Annual Conference of the Advanced School for Computing and Imaging (ASCI'05), pp. 60-65), and Zaharia and Preteux (Hough transform-based 3D mesh retrieval, 2001, Proceedings of the SPIE Conf. 4476 on Vision Geometry X, pp. 175-185). All methods that rely on geometric primitives have the disadvantage that they do not work with general free-form objects.

Several methods for recognizing 3D objects in range images were developed, for example in EP-A-1 986 153. Such methods work on single range images, as returned by a variety of sensor systems. However, all range image based systems are limited to the 3D information acquired from a single range image and cannot cope with general 3D information from other 3D sensors or from the combination of different range images. Additionally they are not fast enough for real-time systems, as they typically require a brute-force search in the parameter space.

Several methods for refining a known 3D pose of an object are known. Such methods require as input an approximate 3D pose of the object in the scene, and increase the accuracy of that pose. Several such methods were developed, such as Iterative Closest Points (see for example Zhang (Iterative point matching for registration of free-form curves, 1994, International Journal of Computer Vision, Vol. 7, Issue 3, pp. 119-152), EP-A-2 026 279 and Fitzgibbon (Robust registration of 2D and 3D point sets, 2003, Image and Vision Computing, Vol. 21, Issue 13-14, pp. 1145-1153)). The major disadvantage of pose refinement is that the input pose needs to be close enough to the correct pose or otherwise the methods will fail to converge. Good approximates of the correct pose are, however, difficult to obtain for 3D scenes that in practical applications often contain clutter, occlusion and noise.

For the foregoing reasons, there is a need for a method that allows efficient recognition of arbitrary free-form 3D objects and recovery of their 3D pose in general 3D scenes.

SUMMARY OF THE INVENTION

The present invention provides a system and method for finding a 3D object in a 3D scene and for determining the 3D pose of the object in scene coordinates. In a typical application the 3D scene is acquired using, for example, stereo with two or more cameras, sheet-of-light, time-of-flight, depth from focus, or photometric stereo. Then the 3D pose of the object is found using the presented method. The resulting 3D pose is used, for example, for manipulating the object with a robot or detecting errors on the object's surface.

The presented method has several advantages over previous methods: It allows the recognition of free-form objects with any kind of surface geometry and is thus not limited to objects of a certain type. Additionally, the method is robust to noise, missing object parts, and clutter. The pose of the 3D object is determined with high accuracy. The finding of the 3D object and the recovery of its 3D pose requires little computation time, and is suitable to real-time environments.

The method comprises two phases. In the offline-phase, a model description is computed that can later be used for finding the 3D object. The user needs to provide a 3D representation of the object to be found, e.g. a 3D CAD model or a set of 3D points. The method requires only the geometric shape of the object. No color, texture or surface reflectance information is required, making the invention suitable for a large range of object types. Additional local information, such as color and texture, may be provided to further increase the robustness of the method. The model description is built by sampling the object's surface at a certain rate, computing a descriptor for each pair of points from the sampled surface and storing the point pairs in a database that is indexed by said point pair descriptor.

In the online phase, the user provides a 3D scene and the model description computed in the offline-phase. The scene's surface is sampled at a certain rate. A subset of those scene points is used as reference points. For each reference point, the 3D pose of the object is parameterized relative to that reference point, the point pair descriptors between the reference point and all other scene points are calculated and searched for in the database created in the offline-phase, and the 3D pose with the most matches in the database is returned. The 3D poses recovered from all reference points are then checked for consistency and the average pose over all consistent 3D poses is used. Finally, the found poses can be improved using any method for pose refinement.

According to a first aspect the invention provides a method for recognizing instances of a 3D object in 3D scene data and for determining the 3D poses of said instances comprising the following steps: (a) providing 3D scene data; (b) selecting at least one reference point from the 3D scene data; (c) computing, for each selected reference point, pose candidates for the 3D object under the assumption that said reference point is part of the 3D object; (d) computing a set of filtered poses from the pose candidates. The 3D scene data in step (a) is preferably provided as a set of 3D points or as a 3D Computer Aided Design model.

Preferably, a 3D model is computed from the 3D object data before step (a) and is used in steps (b), (c) and (d), comprising the following steps: (m1) providing 3D object data of the 3D object; (m2) creating from said 3D object data a 3D model for 3D object recognition and pose determination. The 3D object data in step (m1) is preferably provided as a set of 3D points or as a 3D Computer Aided Design model. According to a preferred embodiment, step (m2) comprises (m2*a*) selecting at least two sample points from the 3D object data; (m2*b*) computing the point pair descriptors that describe, for each pair of selected sample points, the two points and their relation; (m2*c*) creating a global model description that stores the point pairs indexed by the point pair descriptor. More preferably, step (m2*c*) comprises (m2*d*) sampling the point pair descriptors; (m2*e*) creating a global model description that maps each sampled point pair descriptor to a list of point pairs, where each list contains all pairs of selected sample points with identical sampled point pair descriptor.

Preferably, the 3D object data and/or the 3D scene data is filtered before processing comprising at least one of the steps of detecting and removing outliers; reducing noise; computing the surface normals.

The point pair descriptor preferably contains at least one of the following: the distance of the two points, the angle between the two normals of the points and the two angles between each of the normals of the points and the difference vector between the two points.

In accordance with a further preferred embodiment, in step (b) the reference points are selected randomly from the 3D scene data or by uniformly sampling the 3D scene data. The sampling distance for the uniform sampling of the 3D scene data is preferably computed relative to the size of the 3D object.

It is further preferred that in step (c) a score value is calculated for each pose candidate. Preferably, the pose candidates are computed using a voting scheme. The voting scheme preferably comprises the following steps: (c1) sampling the space of possible object poses; (c2) creating a counter for each pose space sample of step (c1); (c3) selecting a set of scene points from the 3D scene data; (c4) computing, for each selected scene point, poses such that both the selected scene point and the reference point are on the surface of the 3D object; (c5) increasing, for each pose computed in step (c4), the counter for the corresponding pose space sample; and (c6) detecting peak counter values in the sampled pose space and selecting the corresponding pose space samples as pose candidates. In step (c6) the detection of peak counter values is limited to counter values that exceed a threshold. In step (c1), the space of possible object poses is preferably represented by two parameters, where the first parameter is a point on the 3D object, and the second parameter is an angle that describes the rotation around the surface normal. The point on the 3D object is preferably represented as index into a set of points selected from the 3D object data, and rotation angle is sampled by dividing the set of angles into intervals of equal size. The set of points is preferably selected from the 3D object data by uniformly sampling the surface of the 3D object.

It is furthermore preferred that in step (c4) the poses are computed using a data structure that allows to search for point pairs on the 3D object that are similar to the pair of the reference point and the selected scene point. The search for point pairs preferably comprises the steps of (c4*a*) computing a point pair descriptor that describes the two points and their relation; (c4*b*) using said point pair descriptor as index to the data structure. The point pair descriptor preferably contains at least one of the following: the distance of the two points; the angle between the two normals of the points; the two angles between each of the normals of the points and the difference vector between the two points; the color or gray value at each point; the texture information at each point; surface descriptors at each point; the curvature at each point; other geometric surface information at each point. The point pair descriptor contains the distance of the two points, the angle between the two normals of the points and the two angles between each of the normals of the points and the difference vector between the two points.

According to a preferred embodiment, step (c4*b*) comprises (c4*c*) sampling the point pair descriptor; (c4*d*) using a data structure that maps the sampled point pair descriptor to a list of point pairs. In step (c4*d*) a hash table is preferably used as data structure.

According to a preferred embodiment, step (d) the computation comprises (d1) defining a neighbor relation between the pose candidates; (d2) computing the score of each pose as the weighted sum of the scores of the neighboring pose candidates; (d3) selecting the set of filtered poses by ranking the poses by the score computed in (d2). Preferably, the neighborhood relation is defined by thresholding the difference in the translation of the poses and the rotation of the poses or by thresholding the maximum distance that a point on the 3D object can have under both poses. The method may further comprise a step where the poses selected in (d3) are recomputed as the average pose over the neighboring poses. The weighting preferably depends on the candidate pose and the current neighboring pose.

The method of the invention preferably further comprises a step that refines each pose of the set of filtered poses by optimizing an error function that is based on the distances between the 3D scene and the 3D object under said pose.

The method of the invention preferably further comprises a step computing a score for each pose of the set of filtered poses, where the score describes the consistency between the 3D scene and the 3D object under said pose.

The method of the invention preferably further comprises a step computing a score for each of the final poses. The computed score is preferably the number of points in the 3D scene that lie of the surface of the 3D object under the computed pose.

BRIEF DESCRIPTION OF THE DRAWINGS

The invention will be more fully understood from the following detailed description, in conjunction with the accompanying figures, wherein.

DETAILED DESCRIPTION OF THE PREFERRED EMBODIMENT

Denotations and Definitions

All of the following data is supposed to be available in electronic form, preferably digital. The methods and algorithms described are considered to be in electronic form and computer implemented.

In the following notation, a 3D point is a point in 3D space that has three coordinate values. Each 3D point refers to a coordinate system, with the most notably coordinate systems being the scene coordinate system where the 3D scene data is defined, and the object coordinate system where the 3D object of interest is defined. A 3D vector is a vector in 3D space that has three coordinate values. A 3D normal vector at a point on a surface is a vector in 3D that has an Euclidian length of 1 and that is perpendicular to the surface at the given point. A 3D point cloud is a set of 3D points. An oriented 3D point cloud is a 3D point cloud where a 3D normal vector is associated with each point. A 3D rigid transformation is a mapping of 3D points to 3D points that preserves the point distances, formally a mapping f such that for any points P, Q the equation $|P-Q|=|f(P)-f(Q)|$ holds. Every 3D rigid transformation can be decomposed into a rotation and a translation, where first the rotation is applied to the argument point, and to that result the translation is applied. Formally, every 3D rigid transformation can be decomposed into a 3D rotation R and a 3D vector T such that $f(P)=R(P)+T$.

Figure 1:
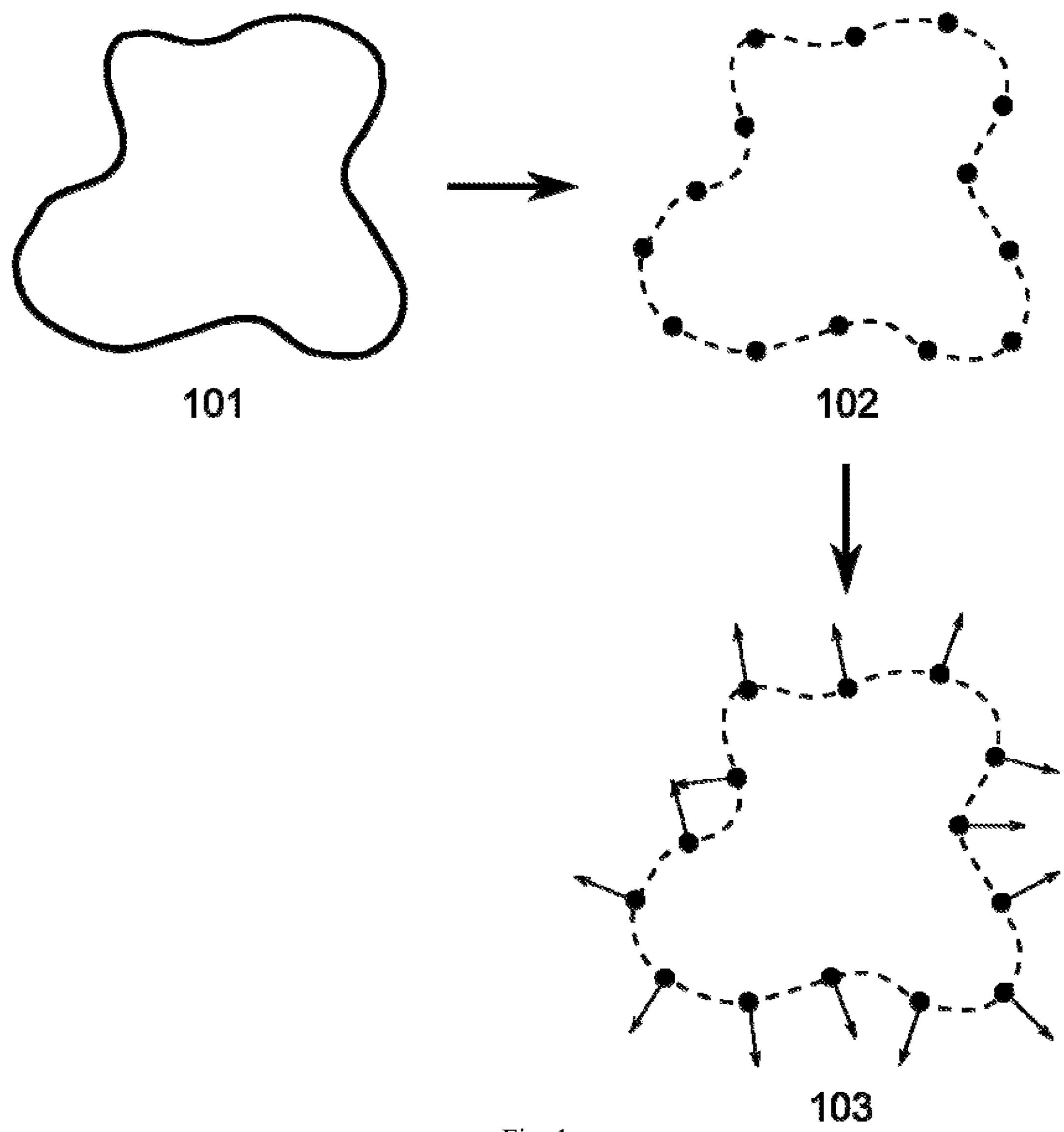
FIG. 1 shows how 3D data is regularized by uniform sampling.

3D data regularization is a method that transforms a surface in 3D into a set of 3D points that are uniformly distributed over said surface, as depicted in FIG. 1. In the preferred embodiment, 3D data regularization is a method that takes as input (a) 3D data that describes a 2D surface in 3D (101), and (b) the sampling distance d; it outputs a set of 3D points (102) that has the properties that (a) it consists only of points that were also on the surface of the input 3D data, (b) all pair of points in the resulting point cloud have a distance of at least d and (c) each point in the input 3D data has a point in the output set that has a distance of at most d. In the preferred embodiment of the invention, the regularized point set with the desired properties is produced for 3D point sets by iterating over the set of input points and adding each of them to the output set only if there is no point in the output cloud yet that is closer to the new point than the sampling distance. 3D CAD models are transformed by sampling each face into a set of points and treating the resulting point set as described before. In an alternative embodiment, the 3D data is regularized by randomly selecting points from the surface. In another alternative embodiment, the normal directions are used for the regularization, where the sub-sampled point set is denser in areas of high curvature. In the preferred embodiment, the surface normals of the points selected from the surface of the 3D data are computed (103).

Regularizing the input point cloud typically leads to a cloud with fewer points that is still a good representation of the original cloud. Regularization is used by our invention in both the offline-phase and the online-phase for efficiently reducing the number of points, leading to faster performance. It is also important for the sampling of the local parameter space, as described below. In the preferred embodiment, the sampling distance d is parameterized in terms relative to the diameter of the object, where the diameter is the maximum distance between two points on the 3D object. Let $D_{obj}$ be the diameter of the object, then the sampling distance d is parameterized by $\tau_d$ as $d=\tau_d D_{obj}$. In an alternative embodiment, the sampling factor is given by the user. In another alternative embodiment, the sampling factor is set according to a-priori information such as the noise level of the 3D data.

The point pair descriptor is a list of values that describe a pair of 3D points. In the preferred embodiment, those values include the distance between the two points, the angle between the two normals, the angle between the first normal and the difference vector of the two points and the angle between the second normal and the difference vector of the two points. In an alternative embodiment, local characteristics such as the color of the surface at the two points, the curvature and other geometric characteristics at the two points, as well as local point descriptors mentioned in the background section, such as spin images, point splashes and others can be included in the point pair descriptor. In general, any subset of the before mentioned values can be used as descriptor without departing from the scope of the invention. Adding more information to the point pair descriptor increases its capability for discriminating between different pairs of points, but also increases its complexity and thus the complexity for calculating, storing and otherwise handling the descriptor.

Figure 2:
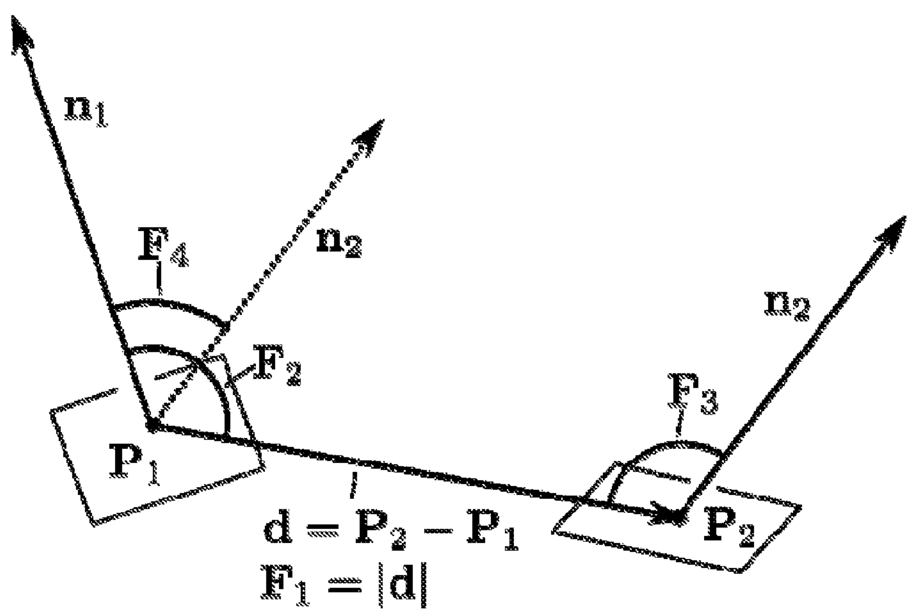
FIG. 2 shows how the relation between two 3D points can be described.

In the preferred embodiment, the formal definition of the point pair descriptor F of two 3D points $P_1$ and $P_2$ with normals $n_1$ and $n_2$ respectively is, as depicted in FIG. 2, $$F(P_1,P_2,n_1,n_2)=(|P_2-P_1|,\angle(n_1,n_2),\angle(n_1,P_2-P_1),\angle(n_2,P_2-P_1)) \quad (1)$$

where $\angle(a, b)$ denotes the angle between two vectors. Similar features were described in the literature, e.g. in Wahl et al. (Surflet-pair-relation histograms: A statistical 3d-shape representation for rapid classification, 2003, Proceedings Fourth International Conference on 3-D Digital Imaging and Modeling 2003 (3DIM 2003), pp. 474-481) who builds an identification system for 3D objects based on histograms of point pair descriptors. For cases where the orientation of the normals is unknown, i.e. only the direction is known, the above angles are normalized to be in [0°; 90°] and invariant to negation of the vectors.

The sampled point pair descriptor is a sampled version of the point pair descriptor. In the preferred embodiment, the four entries of a point pair descriptor are sampled in intervals of equal size to produce the sampled point pair descriptor. The formal definition of the sampled point pair descriptor is as follows: let $n_a$ be the number of intervals for angle values and $d_a=360°/n_a$. Let d be a distance sampling factor as described above and let $\lfloor x \rfloor$ be the largest integer value smaller than x, then the sampled version $F_S(P_1, P_2, n_1, n_2)$ of a point pair feature $F(P_1, P_2, n_1, n_2)=(F_1, F_2, F_3, F_4)$ is defined as $$F_S(P_1,P_2,n_1,n_2)=(\lfloor F_1/d \rfloor,\lfloor F_2/d_a \rfloor,\lfloor F_3/d_a \rfloor,\lfloor F_4/d_a \rfloor) \quad (2)$$

The global model description is a data structure that allows efficiently searching for all point pairs on the object that are similar to a given point pair from the scene. It is thus a data structure or method that takes a point pair from the scene as input and that outputs a list of point pairs on the object that are similar to the input point pair. In the preferred embodiment, a mapping from sampled point pair descriptors to sets of point pairs is used as point pair descriptors. The lookup is done by calculating the sampled point pair descriptor for the given point pair, and using the hash map to retrieve all point pairs that have an equal sampled point pair descriptor. The hash table allows efficient access to similar point pairs where the timing is independent from the number of point pairs stored in the model description. In an alternative embodiment, a method for nearest neighbor access can be used to retrieve all point pairs with a point pair descriptor similar to the one of the given point pair.

Figure 3:
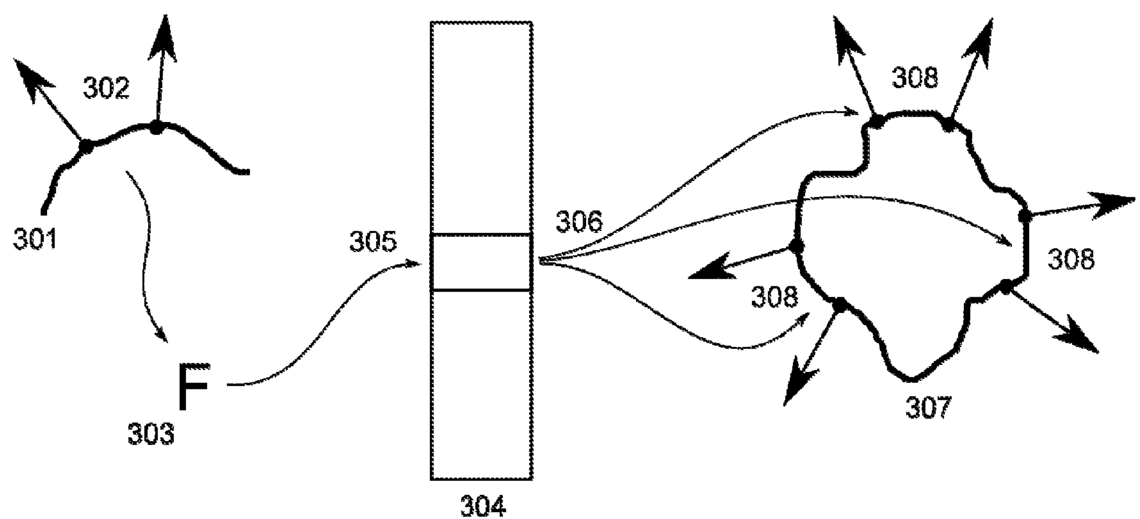
FIG. 3 shows how the global model description, which describes global properties, is created.

In another alternative embodiment, an arbitrary indexing scheme can be used as data structure, for example search trees. FIG. 3 outlines the global model description: A point pair (302) from the surface (301) is selected, and the point pair descriptor (303) is computed. The global model description (304) is indexed using the point pair descriptor (305), and a set of point pairs (208) on the surface of the 3D object (307) is returned that have similar properties as the point pair (302).

Figure 6:
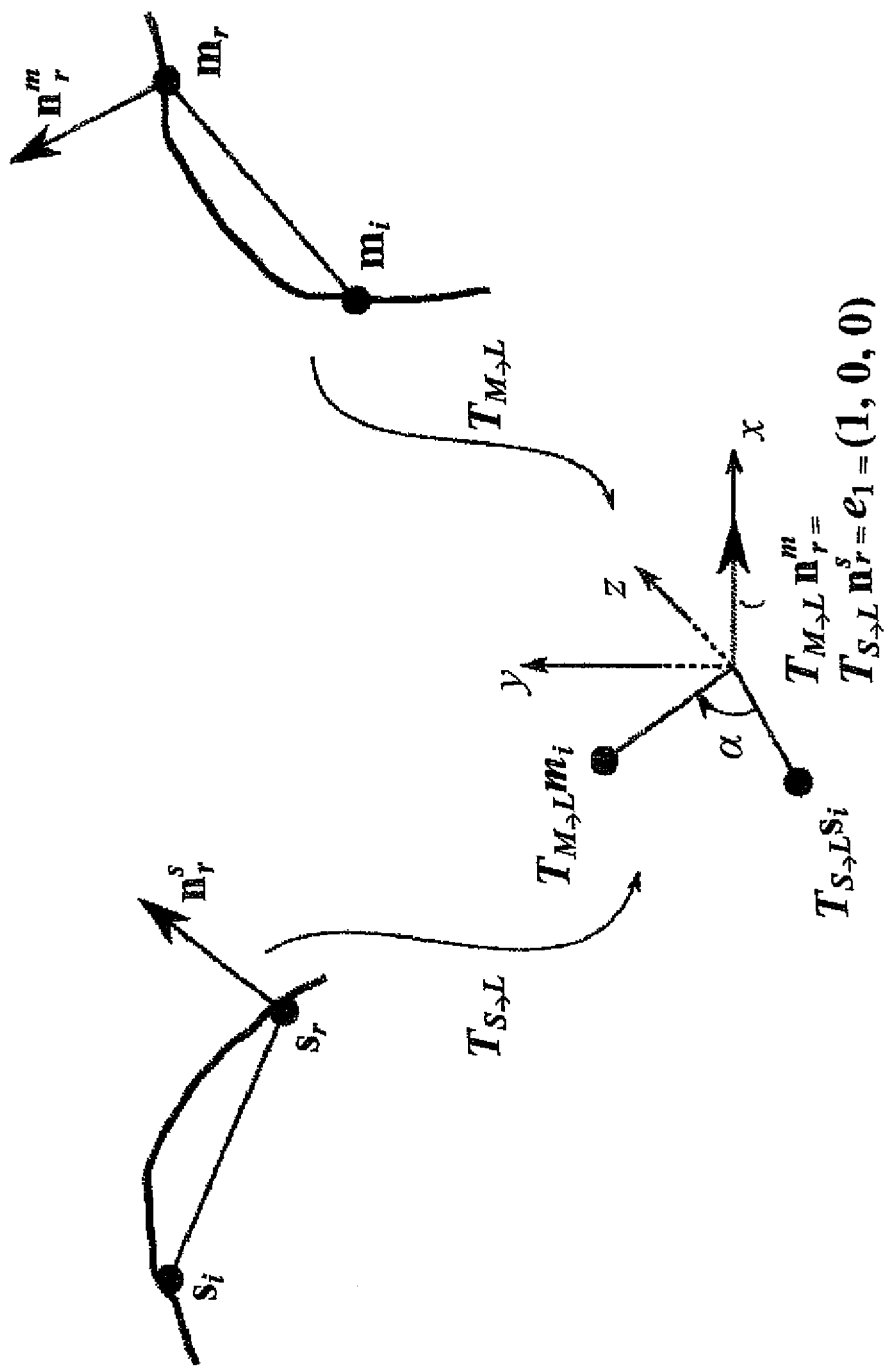
FIG. 6 shows the transformation between the object coordinate system, the local coordinate system and the scene coordinate system using local coordinates.

The local pose of the object in the scene is defined as the 3D pose of an object in a scene relative to a given scene point, called the reference point, under the assumption that the given reference point lies on the surface of the object. The assumption restricts the possible poses. Thus the local pose has less degrees of freedom than a full 3D pose. In the preferred embodiment, the local pose is parameterized using local coordinates as follows: Let $s_r$ be the reference point in the scene that is assumed to lie on the object surface, then (a) $m_r$ is a point on the model surface that corresponds to $s_r$, and (b) $\alpha$ is the angle of rotation around the normal of $s_r$ after aligning $s_r$, $m_r$, and their normals (FIG. 6). The local coordinates with respect to $s_r$ are written as $(m_r, \alpha)$ and have a total of three degrees of freedom, two for the position of $m_r$ on the surface of the model, and one for the rotation angle $\alpha$. In an alternative embodiment, a different parameterization of the object's surface can be used, such as u-v-coordinates or texture coordinates.

For a reference point $s_T$ of the scene, let $T_{S\rightarrow L}$ be a rigid 3D transformation that translates $s_r$ into the origin and rotates the normal of $s_r$ onto the x-axis, pointing into positive direction. For a model point $m_r$, let $T_{M\rightarrow L}$ be a rigid transformation that translates $m_r$ into the origin and rotates the normal of $m_r$ onto the x-axis, pointing into positive direction. Let $R_x(\alpha)$ be the rigid 3D transformation that rotates around the x-axis with angle $\alpha$. Then, the mapping from of a point $m_i$ in model space to its corresponding point $s_i$ in scene space, given the local coordinates $(m_r, \alpha)$ with respect to the reference point $S_r$, can be written as $$s_i=T^{-1}_{S\rightarrow L}R_x(\alpha)T_{M\rightarrow L}m_i \quad (3)$$

If $s_i$, $m_i$, $T_{S\rightarrow L}$ and $T_{M\rightarrow L}$ are known, then the above equation can be solved for $\alpha$.

3D Model Creation

Figure 4:
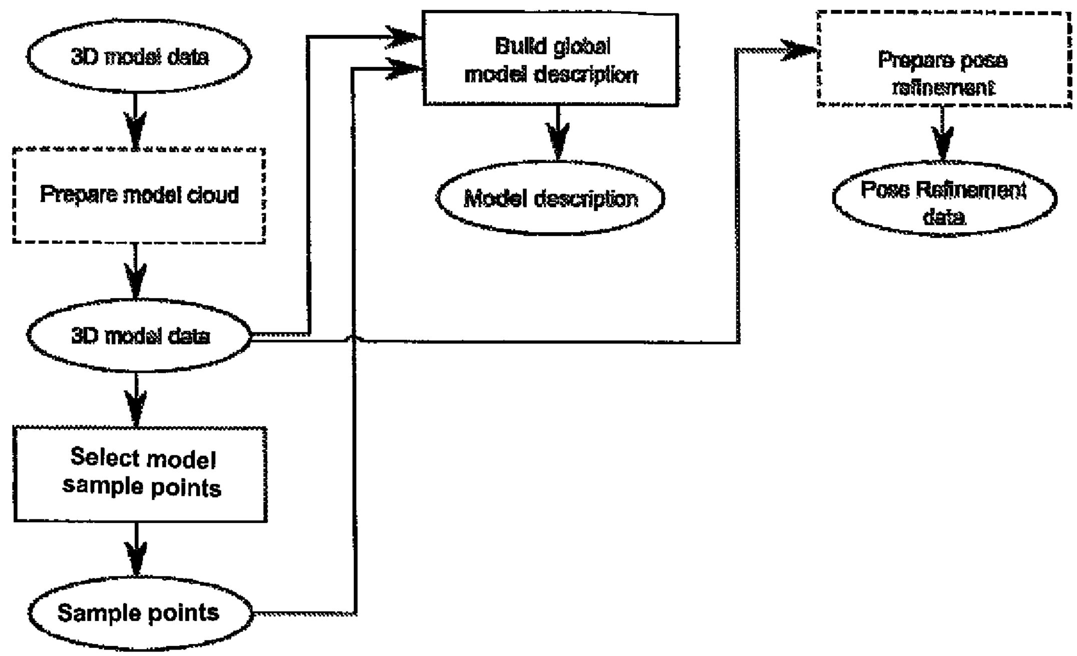
FIG. 4 is a flow-chart of the offline-phase, i.e. the model generation.

In the offline-phase of the method, a model is built that describes the object of interest in a way suitable for later recognizing it in a scene. The method for creating the model comprises the following steps, as depicted in FIG. 4: (a) Optional preparation of the 3D object data; (b) selection of object sample points; (c) creation of the global model description; (d) optionally, preparation for pose refinement. In the preferred embodiment, the created model will comprise the selected sample points and the global model description. In an alternative embodiment, the following information can be included: the original 3D object data; the data computed for pose refinement; additional information required by the user of the method.

The preparation of the 3D object data is a step that serves the purpose of preparing the input 3D data by removing unwanted and adding wanted characteristics. In the preferred embodiment, the following steps are included: (a1) an optional suppression of unwanted characteristics from the data, such as noise and outliers produced by the 3D sensor, where the exact method used depends also on the sensor used for acquiring the data; (a2) computation of the surface normals, which is optional if surface normals are already available.

In the preferred embodiment, the 3D object data is given either as a set of 3D points, or in form of a computer aided design model (CAD-model). In an alternative embodiment, algebraic surfaces can be used. In another alternative embodiment, any other representation of a 3D surface can be used.

From the 3D object data, a set of object sample points needs to be selected for the creation of the global model description. In the preferred embodiment, the 3D object data is subsampled using the 3D data regularization method described above to create a sparse set of sample points. In an alternative embodiment, the user might provide a set of points to be used as sample points. In another alternative embodiment, all points from the 3D object data can be used as object sample points. In yet another alternative embodiment, a random subset of points from the object can be used as sample points. In other alternative embodiments, other object sample point selection strategies are possible without departing from the scope of the invention.

The method for creating the global model description depends on the specific data structure selected for the global model description. In the preferred embodiment, the creation of the global model description comprises (c1) the computation of the point pair descriptor for each pair of points from the set of object sample points; (c2) the storing of each pair of sample points in the global model description by using the computed point pair descriptor as index. In an alternative embodiment, the points can be stored in a data structure such that no point pair descriptor is necessary for efficient lookup of similar point pairs.

If the optional pose refinement shall be used in the matching process and if the selected method for pose refinement requires some sort of data that can be pre-computed from the 3D object, then that data can be computed in the offline-phase as well and be stored with the model. In the preferred embodiment, a data structure that allows a fast search for a point on the object that is closest to a given search point is computed. This data structure is later used for the iterative closest points (ICP) method for pose refinement. In an alternative embodiment, the data structure of any other pose refinement method can be used, for example expectation maximization (EM) (Granger and Pennec (Multi-scale EM-ICP: A fast and robust approach for surface registration, 2002, European Conference on Computer Vision (ECCV 2002), pp. 418-432)).

Object Recognition and Pose Determination

Figure 5:
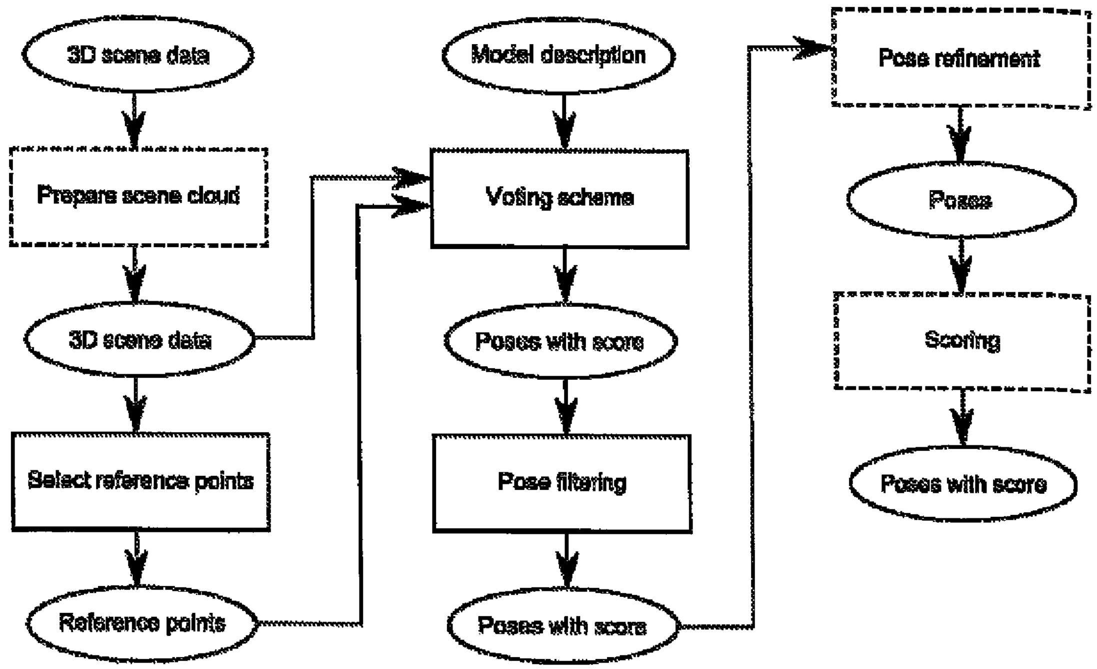
FIG. 5 is a flow-chart of the online-phase, i.e. the matching phase.

The online-phase of the method recognizes instances of a 3D object in a 3D scene and computes the 3D poses of said instances in the scene. It takes as input a 3D scene and a 3D model as computed in the offline-phase, and outputs a set of 3D poses of the object in the scene and optionally a set of scores that rank the poses. The online-phase comprises the following steps, as depicted in FIG. 5: (a) Preparation of the 3D scene data, (b) selection of reference points, (c) computing a set of local coordinates for each reference point that, assuming the reference point is on the object of interest, describe the object position best, (d) filtering the resulting poses to form a final pose, (e) optional pose refinement, and (f) optional scoring of the final pose.

The preparation of the 3D scene data is a step that serves the purpose of preparing the input 3D data by removing unwanted and adding wanted characteristics. In the preferred embodiment, preparing the input 3D data comprises the following steps: (a1) an optional suppression of unwanted characteristics from the data, such as noise and outliers produced by the 3D sensor, where the exact method used depends also on the sensor used for acquiring the data; (a2) computation of the surface normals, which is optional if surface normals are already available; (a3) uniformly distributing the points in the scene point cloud to avoid bias towards more densely sampled parts of the scene, such as parts more closely to the scanner in case of projection based range scanners. In the preferred embodiment, the sampling distance for step (a3) is set to be equal or larger than the sampling distance used for regularizing the model point cloud in the offline-phase and the equal or larger than the sampling distance used for creating the sampled point pair descriptor. Changing the sampling distance leads to a regularized point cloud with a different number of points, which subsequently affects the runtime and accuracy of the disclosed method, and which is thus an important parameter for balancing the two. In an alternative embodiment, the sampling distance can be given by the user. In another alternative embodiment, the sampling distance can be computed from a-priori information such as the noise level of the 3D data.

In the preferred embodiment, the 3D scene data is given either as a set of 3D points, or in form of a computer aided design model (CAD-model). In an alternative embodiment, algebraic surfaces can be used. In another alternative embodiment, any other representation of a 3D surface can be used.

A number of reference points is selected from the 3D scene data, and are used in the subsequent steps. For the method to work, it is important that at least one reference point is selected that lies on the surface of the object of interest, as the subsequent steps find the object pose only if at least one of the reference points fulfils that condition. In the preferred embodiment, the reference points are selected by taking a random subset of points from the scene point cloud, where the number of points in the subset is parameterized relative to the size of the scene point cloud. In an alternative embodiment, all points from the uniformly distributed scene point set or from the original 3D scene data can be used as reference points. In another alternative embodiment, user provided knowledge about the likely position of the object, knowledge about surface characteristics of the model, regularization of the scene point cloud or other methods can be used to steer the selection of the reference points. They can easily be used in the invention without departing from the scope of the invention. The number of selected reference points directly affects the runtime of the disclosed method. The reference point selection method thus needs to balance between selecting too many reference points, leading to poor performance, and too few reference points, where the chance that the object of interest is missed is increased.

For each reference point selected in the previous step, a set of local coordinates is computed that correspond to the 3D poses that the object of interest has most likely under the assumption that the reference point is on the surface of the object of interest. In the preferred embodiment, a voting scheme similar to the generalized Hough transform is employed that computes the local coordinates that best explain the observed data. In alternative embodiments, several other ways of optimizing the local coordinates are possible, including but not limited to exhaustive search and numerical minimization of energy functions.

In the preferred embodiment, a voting scheme for computing the local coordinates of the object of interest is used that is similar to the generalized Hough transform. It comprises the following steps: (c1) the parameter space, here the space of local coordinates, is partitioned into a set of samples, and a counter is attached to each sample and is initially set to zero; (c2) for each point in the scene cloud, all those local coordinates are determined that lead to an explanation of the point by the model, meaning that both the current scene point and the current reference point lie on the surface of the object when transforming the object using those local coordinates; (c3) for each local coordinate that explains the point, the counter of the corresponding parameter space sample that contains the local coordinate is increased; (c4) after processing all scene points through steps (c2) and (c3), the counter for each sample of the local coordinate space will correspond to the number of scene points that explain that part of the parameter space. The sample whose counter has the largest value corresponds to those local coordinates that explain the scene points in the best way. In the last step, the sample with the largest counter value, or a set of samples whose counters exceed a threshold are selected. Several alternative embodiments of the voting scheme are possible, including but not limited to: in step (c2), not using all but only a subset of the scene points; in step (c3), increasing the counter by a value that depends on the weight of the current scene point; in step (c4), analyzing the voting space for peaks using histogram analysis.

In the preferred embodiment, the partitioning of the parameter space in step (c1) above is done as follows: The first component of the local coordinates, i.e. the component that describes a position on the model surface, is described by one of the sample points selected from the 3D object data, and is thus implicitly partitioned into discrete values. The second component, i.e. the component that describes the angle of rotation around the normal of the reference point, is partitioned by dividing the interval [0°; 360°] of possible rotation angles into $n_a$ intervals of equal size, similar to the sampling of the angle values of the sampled point pair descriptor above. In an alternative embodiment, the partitioning of the first component can be done by expressing it in u-v-coordinates or texture coordinates and sampling those.

The computation of the local coordinates that explain the current scene point in step (c2) is done as follows: (c2.1) the point pair descriptor between the reference point and the current scene point is calculated and sampled as described above; (c2.2) the sampled point pair descriptor is used to access the global model description that was computed in the offline-phase, which will return a list of model point pairs that have a similar distance and orientation as the scene point pair; (c2.3) for each such model point pair, the local coordinates are computed using the scene point pair and the model point pair, using equation (3). In an alternative embodiment, the global model description can be based on a nearest neighbor like data structure that allows searching for similar point pairs without sampling the point pair descriptor. In another alternative embodiment, a data structure can be used that allows direct search for similar point pairs without needing a point pair descriptor.

After all scene points were processed, step (c4) selects samples of the parameter space where the corresponding counter has a maximum. In the preferred embodiment, the counter with the largest value, i.e. the global maximum, is selected. In an alternative embodiment, all samples with a counter value that exceeds a certain threshold can be used, where the threshold can be fixed or can depend on the maximum value of all counters. In another alternative embodiment, a method for detecting local peaks in the counter space instead of a global threshold can be used.

One local coordinate is taken from each selected sample, and the local coordinates are transformed into full 3D poses, each of which is returned with the counter value of the corresponding local coordinate sample. The counter value is the score of said 3D pose.

Pose filtering is a method that takes as input pose candidates, optionally augmented with a score value, from one or more reference points, and that outputs a set of filtered poses that contain only the most likely poses of the object of interest, ordered by the likelihood that the pose is correct. In general, a set of poses may contain zero, one or more poses. Pose filtering serves different purposes:

(1) Outlier removal: The pose candidates for a reference point are computed assuming that the reference point lies on the surface of the object of interest. If that assumption is incorrect, for example in case of clutter points in the scene that do not belong to the object of interest, or if the normal of the reference point is incorrect, then the resulting pose candidates for that reference point will contain incorrect poses that do not correspond to the correct pose of the object. Pose filtering is supposed to remove such incorrect poses.

(2) Increased accuracy and stability: If several reference points are on the surface of the object, then the poses candidates for each of them will contain a pose that corresponds to the correct pose of the object. However, due to numerical errors in the calculation, noise in the data, and due to the sampling steps involved in the above schemes, the poses will differ slightly from the correct pose. Pose filtering groups all correct poses found for the different reference points and computes an average pose, thus increasing the accuracy and stability of the final result.

In the preferred embodiment, pose filtering comprises the following steps: (d1) defining a neighborhood relation between poses, where poses are defined as being neighbors if their rotational part differs less than a fixed threshold, and if the difference of their translation vectors has a length smaller than a fixed threshold; (d2) assigning a new score to each pose that is the sum over all scores of neighboring (as defined in (d1)) poses; (d3) sorting the poses by the new score; (d4) selecting the poses with the best scores; (d5) optionally recomputing the selected poses by averaging over the neighboring poses. In an alternative embodiment, the neighborhood relation of poses in step (d1) is defined by thresholding the maximum difference that a point from the model can have under the two poses, e.g.

$$\max_{v \in M} |P_1 v - P_2 v|.$$

In an alternative embodiment of step (d2), the score is calculated as a weighted sum of the score of neighboring poses, where the weighting function depends on the two poses. In another alternative embodiment of (d1), all poses are considered neighbors and a weighting function is used as described. Additionally, no poses can be considered neighbors in step (d1), effectively leading to the selection of the pose that has the highest single score from the voting scheme. In an alternative embodiment, a clustering method such as k-means or mean shift can be used to select the set of final poses. In the preferred embodiment of step (d5), the translation is averaged by calculating the mean of the translation vectors of the poses, and the rotation is averaged by computing the average Rodriguez vector of the rotations of the poses. In an alternative embodiment of step (d5), the rotations can be composed with the inverse of the rotation of the selected pose prior to calculating the average rotation. This increases the stability of the mean rotation. In another alternative embodiment of step (d5), the average rotation is calculated by optimizing a score function that depends on the poses and the average pose. In alternative embodiments, several other methods are possible for achieving one or more of the above mentioned purposes without departing from the scope of the invention.

Pose refinement describes a class of methods that take as input a 3D object model, a 3D scene and an approximate pose of the model in the scene, and that output a refined, more precise pose of the model. Pose refinement methods typically optimize the correspondence between the scene and the object by minimizing an error function. The drawback of pose refinement is that the initial approximate pose needs to be known and good enough for the method to converge. Our invention as described above computes an approximate pose of the object, which is good enough to be refined using pose refinement. The usage of pose refinement is optional and depends on the accuracy required by the user of the invention. The resulting pose of the presented method is typically accurate enough for object manipulation such as grasping. However, applications that use the invention for surface inspection, for example detecting incorrectly produced parts, might require a pose refinement step. In the preferred embodiment, iterative closest points (ICP) is used for pose refinement. For ICP, the sum of distances between points in the scene and the object surface is minimized. In an alternative embodiment, expectation maximization can be used for pose refinement. In another alternative embodiment, any method that minimizes the distances between scene points and object can be used. In other alternative embodiments, several other methods for refining the approximate pose are possible without departing from the scope of the invention.

Scoring is a method that takes as input the final pose as calculated in the algorithm as well as the 3D scene data and the 3D object data, and that outputs one or more values that describe the quality of the calculated pose or the consistency between scene and object under said pose. The quality and accuracy of the final pose depends, among other things, on the presence and visibility of the object of interest in the scene, as well as on the quality of the scene data and the model data. Scoring is required to give the user of the method a way of evaluating the resulting pose, which is a base for subsequent decisions.

Several alternative embodiments for scoring the final pose are possible, including but not limited to: (a) returning the score of the pose as calculated in the voting scheme; (b) returning the accumulative score as calculated in the pose filtering step; (c) counting the number of scene points that lie on the model surface given the resulting pose; (d) computing the covariance of the distances between the scene points and the model surface for scene points that are close to the model under the resulting pose; (e) projecting the model into the image of the range sensor that was used to acquire the scene data, and computing the distances between the model and the scene points in the image domain; (f) the method of (e), but with an additional step of verifying the visibility of the projected model points from more than one view point, as required in the case of stereo methods; (g) computing the sum of the dot products between the normals of the model surface points and the corresponding scene surface points; (h) computing the ratio of the visible model surface and the total model surface, or between the visible model surface and the model surface that is visible in the sensor camera given the resulting pose; (i) using two or more of the methods from (a) through (h) and combining the resulting values. Additional ways of computing a score are possible, depending on the requirements of the user and on the sensor characteristics, without departing from the scope of the invention.

In the preferred embodiment, if no pose refinement is used, the score calculated in the pose filtering step as calculated in method (b) is returned; if pose refinement is used, the score of method (c), (d), (e) or (f) is returned.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

Furthermore, in the claims the word "comprising" does not exclude other elements or steps, and the indefinite article "a" or "an" does not exclude a plurality. A single unit may fulfil the functions of several features recited in the claims. The terms "essentially", "about", "approximately" and the like in connection with an attribute or a value particularly also define exactly the attribute or exactly the value, respectively. Any reference signs in the claims should not be construed as limiting the scope.

The invention claimed is:

1. A method for recognizing instances of a 3D object represented by 3D object data in a 3D scene represented by 3D scene data and for determining the 3D poses of said instances comprising the following steps:

(a) providing 3D scene data and 3D object data;

(b) selecting at least one reference point from the 3D scene data;

(c) computing, for each selected reference point, pose candidates for the 3D object under the assumption that said reference point is part of the 3D object, by:

(c1) representing a space of possible pose candidates by two parameters, where a first parameter is a 2D point on the surface of the 3D object data that corresponds to said reference scene point, and a second parameter is a rotation angle;

(c1*a*) representing the first parameter as index into a set of points selected from the 3D object data and sampling the second parameter;

(c2) creating a counter for each pose space sample of step (c1*a*);

(c3) selecting a set of scene points from the 3D scene data;

(c4) computing, for each selected scene point, matching poses such that both the selected scene point and the reference point are on the surface of the 3D object by (c4*a*) computing a point pair descriptor that describes the reference scene point and the current scene point and their geometric relation;

(c4*b*) searching for point pairs in the 3D object data similar to said scene point pair using said point pair descriptor;

(c4*c*) computing, for each such similar point pair, the point corresponding to the reference scene point, and the rotation angle that aligns the scene point pair and the object point pair, after aligning the reference scene point, its corresponding object point and their surface normals;

(c5) increasing, for each corresponding point and rotation angle computed in step (c4*c*), the counter for the corresponding pose space sample; and (c6) detecting peak counter values in the sampled pose space and selecting the corresponding pose samples as pose candidates.

2. The method of claim 1, wherein a 3D model is computed from the 3D object data before step (b) and is used in the subsequent steps, comprising the following steps:

(a1) selecting at least two sample points from the 3D object data;

(a2) computing the point pair descriptors that describe, for each pair of selected sample points, the two points and their geometric relation;

(a3) creating a global model description that stores the point pairs indexed by the point pair descriptor.

3. The method of claim 2, wherein step (a3) comprises:

(a3*a*) sampling the point pair descriptors;

(a3*b*) creating the global model description such that it maps each sampled point pair descriptor to a list of point pairs, where each list contains all pairs of selected sample points with identical sampled point pair descriptor.

4. The method of claim 1, wherein in step (b) the reference points are selected randomly from the 3D scene data or by uniformly sampling the 3D scene data.

5. The method of claim 1, wherein step (c4*b*) comprises:

(c4*b*1) sampling the point pair descriptor;

(c4*b*2) using a data structure that maps the sampled point pair descriptor to a list of point pairs.

6. The method of claim 5, wherein in step (c4*b*2) a hash table is used as data structure.

7. The method of claim 1, further comprising a step computing a score for each computed pose candidate, where the score describes the consistency between the 3D scene data and the 3D object data under said pose.

8. The method of claim 1 further comprising the step of:

(d) filtering the pose candidates to obtain a set of final poses.

9. The method of claim 8, wherein in step (d) the computation comprises:

(d1) defining a neighborhood relation between the pose candidates;

(d2) computing the score of each pose as the weighted sum of the scores of the neighboring pose candidates;

(d3) selecting the set of filtered poses by ranking the poses by the score computed in (d2).

10. The method of claim 9, wherein the neighborhood relation is defined by thresholding the difference in the translation of the poses and the rotation of the poses or by thresholding the distance between a surface point of an object in a candidate pose and the same surface point of the object in a different candidate pose.

11. The method of claim 9, further comprising a step where the poses selected in (d3) are recomputed as the average pose over the neighboring poses.

12. The method of claim 8, further comprising a step that refines each final pose computed in step (d) by optimizing an error function that is based on the distances between the 3D scene data and the object data under said pose.

13. The method of claim 8, further comprising a step of computing a score for each final pose computed in step (d), where the score describes the consistency between the 3D scene data and the 3D object data under said pose.

* * * * *

UNITED STATES PATENT AND TRADEMARK OFFICE

CERTIFICATE OF CORRECTION

PATENT NO. : 8,830,229 B2
APPLICATION NO. : 12/985861
DATED : September 9, 2014
INVENTOR(S) : Drost et al.

It is certified that error appears in the above-identified patent and that said Letters Patent is hereby corrected as shown below:

Title page insert item (30),

-- Foreign Application Priority Data
May 7, 2010 (EP) 10 16 2266.0 --

Signed and Sealed this
Twenty-third Day of December, 2014

Michelle K. Lee
*Deputy Director of the United States Patent and Trademark Office*